6487X
C. Adams,
Bedstead Fastening,
Patented Apr. 18, 1831
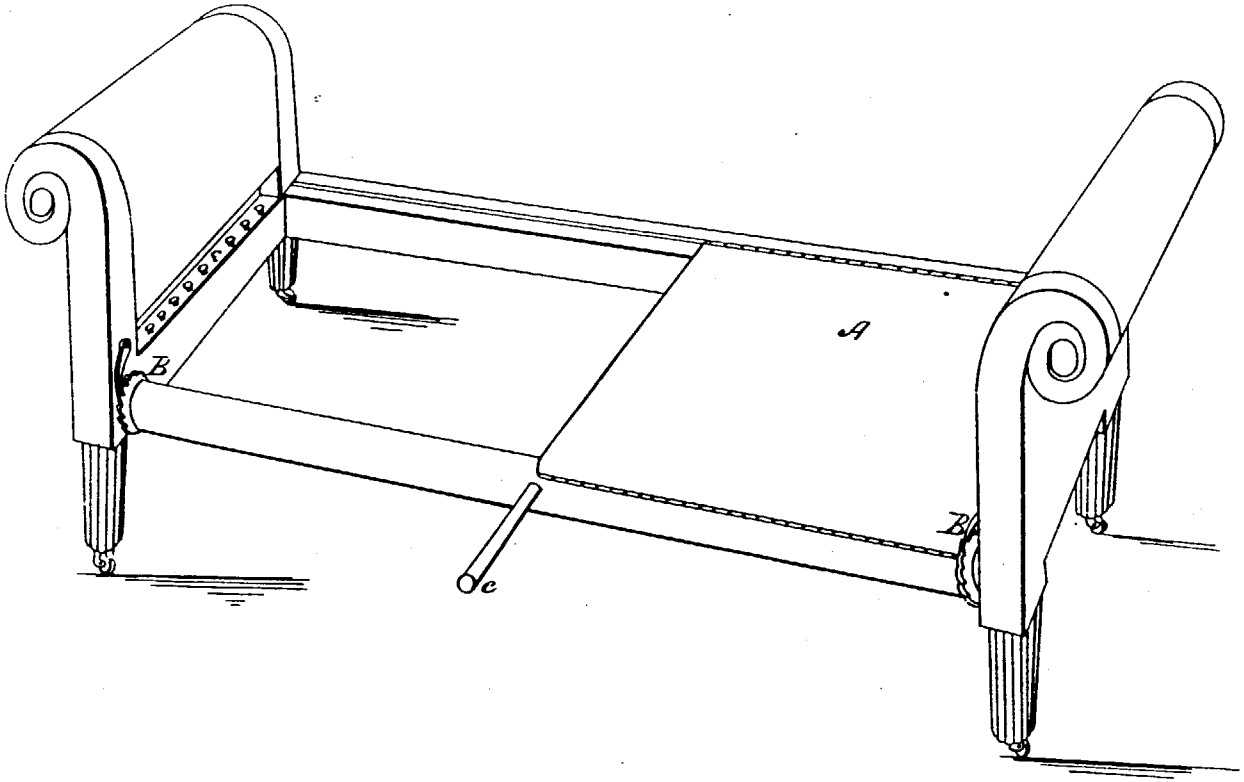

Charles Adams
Letters Patent

The Schedule referred to in these Letters Patent and making part of the
same containing a description in the words of the said Charles Adams him-
self of his improvement in the art of constructing and manufacturing couch
es, sofas, settees and chairs

---

To all persons to whom these presents shall come. Charles Adams of the City
of Boston County of Suffolk and Commonwealth of Massachusetts cabi
net maker sends greeting. Be it known that I the said Charles Adams have
invented constructed made and applied to use a new and useful improve
ment in the art of constructing and manufacturing couches, sofas, settees and
chairs which I call the windlass couch, sofa, settee or chair. What I claim
as my improvement in the manufacture of the above mentioned articles
consists in the application of the windlass principle in binding and hold-
ing together the parts and tightening the sacking or other material upon which
the cushion lies which affords advantages before unknown. To give a clear il-
lustration of this it is necessary to describe the several parts in the construction
which are as follows: The several beams or rails (the front- back and end
beams or rails) are formed with round tenons at each end so that they may
turned in the posts by a small lever, each beam or rail having at one
or both ends a ratchet wheel or segment of one into the teeth of which a small click
falls to hold fast what the lever gains this click is swivelled on the side of the post
just above the ratchet. On the upper side of the end rails are three or four short
pins with button heads around which a strong cord passes and alternately
through eyelet holes made in the ends of the sacking each end of the cord made
fast; so that by turning the rails the sacking is tightened lengthwise. The front
and back edges of the sacking may be nailed fast to the front and back beam
or rail or it may be hitched on button headed pins inserted into the rails and
then be tightened widthwise by turning said beams or rails. It is proper to
observe that the front rail or beam may be framed firmly into the post so as
to not turn and the sacking tightened by turning the back rail only. By this
application application of the windlass the frames of the abovementioned articles may be
kept tight and firm at all times. The seats are rendered more firm elastic
and comfortable with less expense of material and labor in the stuffing
than if made in the common way. The frame can be taken apart at
any time and rendered capable of easy removal from place to place and
through small and narrow passages. They are rendered more portable
and much expense of freight may be saved when shipped in consequence
of close packing and the whole article may be manufactured at less expense.
In testimony that the above is a true specification of my said improve
ment I have hereunto set my hand and seal this first day of January in
the year of our Lord one thousand eight hundred and thirty one Witnesses
Hawkes Lincoln
Ex.d John Johnson
Ch.f.W.

Charles Adams 588 n.b.